(12) United States Patent
Kim et al.

(10) Patent No.: US 7,444,049 B1
(45) Date of Patent: Oct. 28, 2008

(54) PULSE STRETCHER AND COMPRESSOR INCLUDING A MULTI-PASS BRAGG GRATING

(75) Inventors: Kyungbum Kim, Cotati, CA (US); Laurent Vaissié, Oviedo, FL (US); Robert G. Waarts, Los Altos, CA (US); Andrew Stadler, San Francisco, CA (US); Michael J. Cumbo, Santa Rosa, CA (US)

(73) Assignee: Raydiance, Inc., Orlando, FL (US)

( * ) Notice: Subject to any disclaimer, the term of this patent is extended or adjusted under 35 U.S.C. 154(b) by 0 days.

(21) Appl. No.: 11/615,883

(22) Filed: Dec. 22, 2006

Related U.S. Application Data

(60) Provisional application No. 60/763,002, filed on Jan. 26, 2006, provisional application No. 60/762,791, filed on Jan. 26, 2006, provisional application No. 60/762,790, filed on Jan. 26, 2006, provisional application No. 60/762,284, filed on Jan. 25, 2006, provisional application No. 60/761,736, filed on Jan. 23, 2006.

(51) Int. Cl.
*G02B 6/34* (2006.01)
*G02B 5/18* (2006.01)

(52) U.S. Cl. .................................. 385/37; 359/566
(58) Field of Classification Search ................ None
See application file for complete search history.

(56) References Cited

U.S. PATENT DOCUMENTS

| | | | |
|---|---|---|---|
| 5,499,134 A * | 3/1996 | Galvanauskas et al. | 359/333 |
| 6,760,356 B2 * | 7/2004 | Erbert et al. | 372/93 |
| 6,956,680 B2 * | 10/2005 | Morbieu et al. | 359/15 |
| 7,321,605 B2 * | 1/2008 | Albert | 372/30 |
| 2006/0221449 A1 * | 10/2006 | Glebov et al. | 359/575 |

* cited by examiner

*Primary Examiner*—Omar Rojas
(74) *Attorney, Agent, or Firm*—Carr & Ferrell LLP

(57) ABSTRACT

A chirped pulse amplification (CPA) system and method is described wherein the pulse is stretched using multiple passes through a Bragg grating or compressed using multiple passes through a Bragg grating. A switch may be used to control the number of passes through the Bragg grating, thus, tuning the compressed or the stretched pulse width. The pulse may be directed through an amplifier between the multiple passes through the Bragg grating to apply amplification to the stretched pulse multiple times. The Bragg grating may include a fiber Bragg grating, a volume Bragg grating, or a Bragg waveguide.

23 Claims, 13 Drawing Sheets

PULSE STRETCHER AND COMPRESSOR INCLUDING A MULTI-PASS BRAGG GRATING

CROSS-REFERENCE TO RELATED APPLICATIONS

This application claims benefit of:
U.S. Provisional Patent Application Ser. No. 60/761,736, filed on Jan. 23, 2006, entitled "METHOD OF DISPERSION COMPENSATION IN A CPA SYSTEM,"
U.S. Provisional Patent Application Ser. No. 60/762,284, filed on Jan. 25, 2006, entitled "USP LASER FIBER AMPLIFIER,"
U.S. Provisional Patent Application Ser. No. 60/763,002, filed on Jan. 26, 2006, entitled "SEED CONTROL IN ULTRA-SHORT PULSE LASER SYSTEMS,"
U.S. Provisional Patent Application Ser. No. 60/762,791, filed on Jan. 26, 2006, entitled "AMPLIFIER CONTROL IN ULTRA-SHORT PULSE LASER SYSTEMS" and
U.S. Provisional Patent Application Ser. No. 60/762,790, filed on Jan. 26, 2006, entitled "METHOD OF REMOTE ACCESS TO AN ULTRA-SHORT PULSE LASER SYSTEM."

This application is related to co-pending U.S. patent application entitled "Bragg Fibers in Systems for the Generation of High Peak Power Light," Ser. No. 11/112,256, filed Apr. 22, 2005, which in turn claims the benefit and priority of U.S. provisional patent applications Ser. Nos. 60/635,734, filed on Dec. 13, 2004, and entitled "Bragg Fibers For The Generation Of High Peak Power Light," and 60/636,376, filed on Dec. 16, 2004, and entitled "Bragg Fibers In Systems For The Generation Of High Peak Power Light;" and co-pending U.S. patent application, entitled "High Order Mode Optical Amplifier in an Ultrashort Pulse Laser System," Ser. No. 11/491,219, filed Jul. 20, 2006, which in turn claims the benefit and priority of U.S. Provisional patent application, entitled "Chirped Pulse Amplifier System Including Tapered Fiber Bundle," Ser. No. 60/793,960, filed Apr. 20, 2006.

The disclosures of all of the above U.S. patents and patent applications are incorporated by reference herein.

BACKGROUND OF THE INVENTION

1. Field of the Invention

The present invention relates to stretching and compressing electromagnetic pulses, and more particularly laser pulses.

2. Description of Related Art

Chirped pulse amplification (CPA) is very useful for producing ultrashort-duration high-intensity pulses for use in high peak power ultrashort pulse laser systems. CPA increases the energy of an ultrashort laser pulse while avoiding optical amplifier damage. In this technique, the duration of the pulse is increased by first dispersing the ultrashort laser pulse temporally as a function of wavelength (a process called "chirping") to produce a chirped pulse, then amplifying the chirped pulse, and then recompressing the chirped pulse to significantly shorten its duration. Lengthening the pulse in time reduces the peak power of the pulse and, thus, allows energy to be added to the pulse without reaching a damage threshold of the pulse amplifier and optical components. The amount of pulse amplification that can be achieved is typically proportional to the amount of pulse stretching and compression. Typically, the greater the amount of stretching and compression, the greater the possible pulse amplification.

A fiber Bragg grating may be used for chirping a pulse and recompressing the pulse. However, the amount of stretching or compression by the fiber Bragg grating is substantially fixed by the physical dimensions of the fiber Bragg grating. Thus, various sizes of fiber Bragg gratings are used for chirping and/or compressing pulses. In some fiber Bragg gratings, nominal adjustments to the pulse length may be provided by physically, mechanically, or thermally stretching the optical fiber of the fiber Bragg grating to modify the length of the optical fiber. Unfortunately, the amount of adjustment to the pulse length is relatively small and the optical fiber may suffer damage from the physical stress and strain of the stretching. There is, therefore, a need for improved systems and methods of stretching and compressing optical pulses.

SUMMARY OF THE INVENTION

Various embodiments of the invention include a CPA system for amplifying a chirped pulse to a high power. The CPA system is configured to stretch and/or compress the pulse using multiple passes through a Bragg grating. In various embodiments, the Bragg grating includes a fiber Bragg grating, a volume Bragg grating, a fiber Bragg grating, a volume fiber Bragg grating, a bulk grating, a chirped fiber Bragg grating (CFBG), a chirped volume Bragg grating (CVBG), a Gires-Tournois Interferometer (GTI) in planar waveguide, a Fabry-Perot GTI, and/or the like. As used in this application, the term Bragg grating is intended to further include a Bragg waveguide. In various embodiments, a Bragg waveguide could be a Bragg fiber, a fiber Bragg grating, and/or the like. Bragg fibers are characterized in U.S. patent application entitled "Bragg Fibers in Systems for the Generation of High Peak Power Light," Ser. No. 11/112,256, filed Apr. 22, 2005.

The multiple passes of the pulse through the Bragg grating enable stretching and/or compression of the pulse multiple times. The number of passes through the Bragg grating determines the amount of stretching and/or compression of the pulse. For example, a pulse can be stretched by a greater amount using multiple passes than using a single pass. Likewise, the pulse can be compressed by a greater amount using multiple passes than using a single pass. The number of passes may be selected to control the amount of stretching and/or compression.

Beam steering optics may be configured for directing the pulse through the Bragg grating multiple times. For example, the beam steering optics may direct the pulse through multiple paths within a volume Bragg grating. In some embodiments, the beam steering optics includes a switch configured to control the number of times a pulse passes through a Bragg grating. In some embodiments, a pulse may traverse multiple Bragg gratings, each multiple times. In some embodiments, a volume Bragg grating is configured to both stretch and compress a pulse multiple times, using beam steering optics to direct the pulse through appropriate paths. In some embodiments, the pulse is amplified between passes through the Bragg grating. In various embodiments, the Bragg grating, beam steering optic components, amplifiers, delay lines, switches, and/or the like may be mounted and/or fabricated on a wafer.

Various embodiments of the invention include a laser system comprising a source configured to emit a pulse, a Bragg grating configured to receive the pulse and compress the pulse to generate a compressed pulse, and beam steering optics configured to direct the compressed pulse into the Bragg grating one or more times to further compress the compressed pulse.

Various embodiments of the invention include a laser system comprising a source configured to emit a pulse, a Bragg grating configured to receive the laser pulse and stretch the pulse to generate a stretched laser pulse, and beam steering optics configured to direct the stretched pulse into the Bragg grating one or more times to further stretch the stretched pulse.

Various embodiments of the invention include a system comprising a volume Bragg grating configured to receive a laser pulse, and beam steering optics configured to direct the laser pulse into the volume Bragg grating two or more times, each of the two or more times being to compress the laser pulse, or direct the laser pulse into the volume Bragg grating two or more times, each of the two or more times being to stretch the laser pulse.

Various embodiments of the invention include a system comprising a Bragg grating configured to receive a pulse and output a compressed or stretched the pulse, and a switch configured to receive the compressed or stretched pulse from the Bragg grating and, in a first state, to direct the compressed or stretched pulse one or more times into the Bragg grating for further compression or stretching to produce a multiply stretched or multiply compressed pulse and, in a second state, to direct the multiply compressed or multiply stretched pulse as an output pulse.

Various embodiments of the invention include a method comprising receiving a pulse in a Bragg grating, compressing the pulse using the Bragg grating to generate a compressed pulse, directing the compressed pulse into the Bragg grating, and further compressing the compressed pulse one or more times using the Bragg grating to generate a multiply compressed pulse.

Various embodiments of the invention include a method comprising receiving a pulse in a Bragg grating, stretching the pulse using the Bragg grating to generate a stretched pulse, directing the stretched pulse into the Bragg grating, and further stretching the stretched pulse one or more times using the Bragg grating to generate a multiply stretched pulse.

Various embodiments of the invention include a method comprising receiving a pulse in a first Bragg grating, stretching the pulse using the first Bragg grating two or more times to generate a multiply stretched pulse, amplifying the multiply stretched pulse to generate an amplified pulse, and compressing the amplified pulse two or more times using a second Bragg grating.

DETAILED DESCRIPTION

Figure 1A:
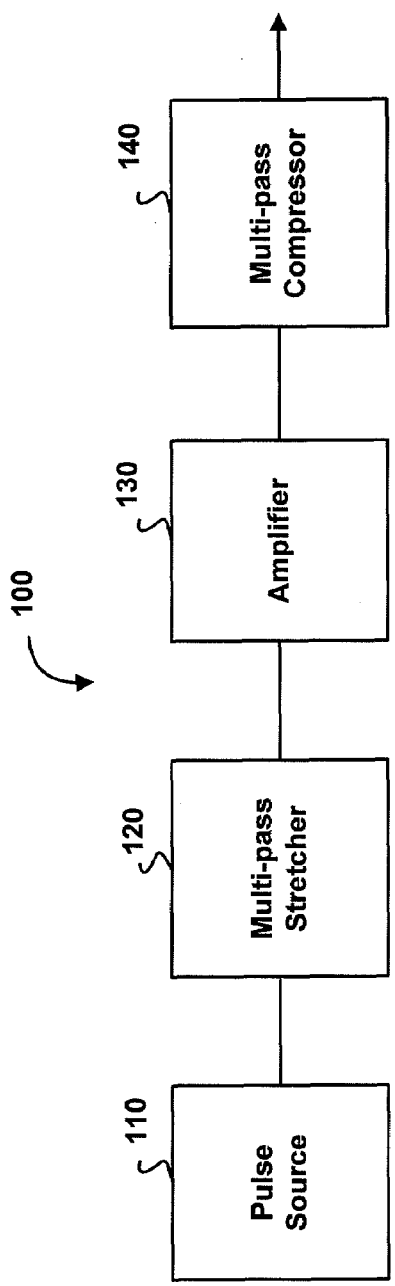
FIG. 1A is a block diagram illustrating various embodiments of a chirped pulse system.

FIG. 1A is a block diagram illustrating various embodiments of a chirped pulse system generally designated 100. The chirped pulse system 100 includes a pulse source 110, an optional multi-pass stretcher 120, an amplifier 130 and an optional multi-pass compressor 140. The pulse source 110 is configured to generate a pulse having a duration, amplitude, mode, and phase profile. In various embodiments, the pulse source 110 comprises, for example, a ring laser, a laser oscillator, a chirped pulse source, a quasi-continuous wave laser, or the like. In some embodiments, the pulse source 100 generates a chirped pulse. In these embodiments, multi-pass stretcher 120 is optional. Chirped pulse system 100 includes at least one of the multi-pass stretcher 120 and the multi-pass compressor 140. For example, in some embodiments the multi-pass stretcher 120 is replaced by a single-pass stretcher of the prior art. These embodiments include the multi-pass compressor 140.

The multi-pass stretcher 120 is configured to receive the pulse from the pulse source 110 and includes one or more Bragg gratings through which the pulse is directed one or more times. In various embodiments, the pulse traverses at least one Bragg grating multiple times, and may pass through multiple Bragg gratings one or more times each.

The Bragg grating may be fabricated using a photorefractive glass that has an altered refractive index in areas that have been exposed to UV light. The areas of altered refractive index may be arranged so as to stretch and/or compress a pulse. Optionally, the path of the pulse through the Bragg grating determines whether the pulse is stretched or compressed. In some embodiments the Bragg grating is a chirped volume Bragg grating (CVBG) configured to stretch (or chirp) a pulse.

The volume Bragg grating optionally includes a cross-sectional aspect ratio in which one dimension is significantly larger than another dimension. For example the volume Bragg grating may have a cross-sectional height of microns and a cross sectional width on the order of one or more millimeters. In these embodiments, the volume Bragg grating may act as a single mode waveguide in one dimension and as a bulk optic in another dimension. In various embodiments, the cross-sectional dimensions may be in ratios of at least 1:1, 1:5, 1:10, 1:50, 1:100, 1:500, 1:1000, 1:5000, and 1:10,000.

Embodiments with aspect ratios greater than 1:1 may be particularly suited for fabrication on a wafer.

The amplifier 130 is configured to receive the stretched pulse from the multi-pass stretcher 120 and amplify the pulse. In some embodiments, the amplifier 130 is configured to amplify the pulse between passes through a Bragg grating of the multi-pass stretcher 120. In various embodiments, the amplifier 130 includes a doped fiber amplifier, a semiconductor optical amplifier, a double-clad fiber amplifier, a photonic crystal fiber amplifier, Raman amplifier, and/or the like. In some embodiments, the amplifier 130 comprises a tapered fiber bundle amplifier. Further details of an amplifier including a tapered fiber bundle may be found within U.S. Provisional Patent Application Ser. No. 60/793,960, entitled "Chirped Pulse Amplifier System Including Tapered Fiber Bundle." In some embodiments, the amplifier comprises a high order mode fiber amplifier such as that described in U.S. patent application Ser. No. 11/491,219, entitled "High Order Mode Optical Amplifier in an Ultrashort Pulse Laser System."

The multi-pass compressor 140 is configured to receive the amplified pulse from the amplifier 130 and includes one or more Bragg gratings configured to receive the amplified pulse one or more times. In various embodiments, the amplified pulse traverses at least one Bragg grating multiple times, and may pass through multiple Bragg gratings one or more times each. The temporal dispersion caused by the Bragg grating may be controlled by stretching the Bragg grating using a mechanical stretcher or a temperature controller. For example, if the Bragg grating is a volume Bragg grating its dispersion properties may be controlled by heating or cooling the volume Bragg grating. In some embodiments, the multi-pass compressor 140 is replaced by a single-pass compressor of the prior art. These embodiments include the multi-pass stretcher 120.

Figure 1B:
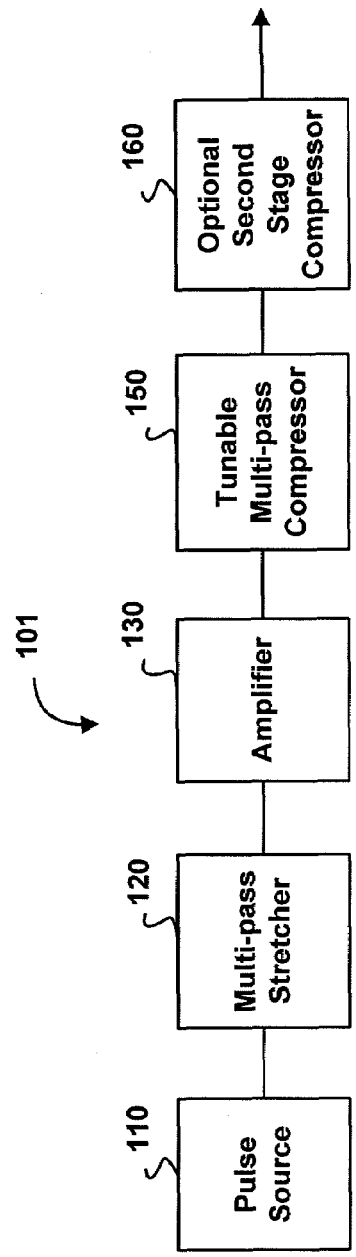
FIG. 1B is a block diagram illustrating various embodiments of a chirped pulse system including a tunable multi-pass compressor.

FIG. 1B is a block diagram illustrating various embodiments of a chirped pulse system generally designated 101 and including a tunable multi-pass compressor. The chirped pulse system 101 in FIG. 1B differs from the chirped pulse system 100 in FIG. 1A in that the chirped pulse system 101 includes a tunable multi-pass compressor 150 and/or an optional second stage compressor 160. The chirped pulse system 101 is an alternative embodiment of the Chirped pulse system 100. The tunable multi-pass compressor 150 and/or an optional second stage compressor 160 represent alternative embodiments of the multi-pass compressor 140. The tunable multi-pass compressor 150 is configured to be tuned by controlling the number of passes of the pulse through a Bragg grating, and thus, controlling the output pulse width. In some embodiments, the tunable multi-pass compressor 150 is configured to provide fine control of the pulse width and the second stage compressor 160 is configured to provide coarse compression. In various embodiments, the second stage compressor 160 includes a single pass compressor or a multi-pass compressor. The second stage compressor 160 optionally includes a Bragg grating, e.g. a fiber Bragg grating or a Bragg waveguide. In some embodiments, chirped pulse system 101 is configured such that the second stage compressor 160 receives a pulse from the amplifier 130 and the output of the second stage compressor 160 is received by the tunable multi-pass compressor 150. In these embodiments, the pulse may be substantially compressed prior to being received by the tunable multi-pass compressor 150.

Figure 2:
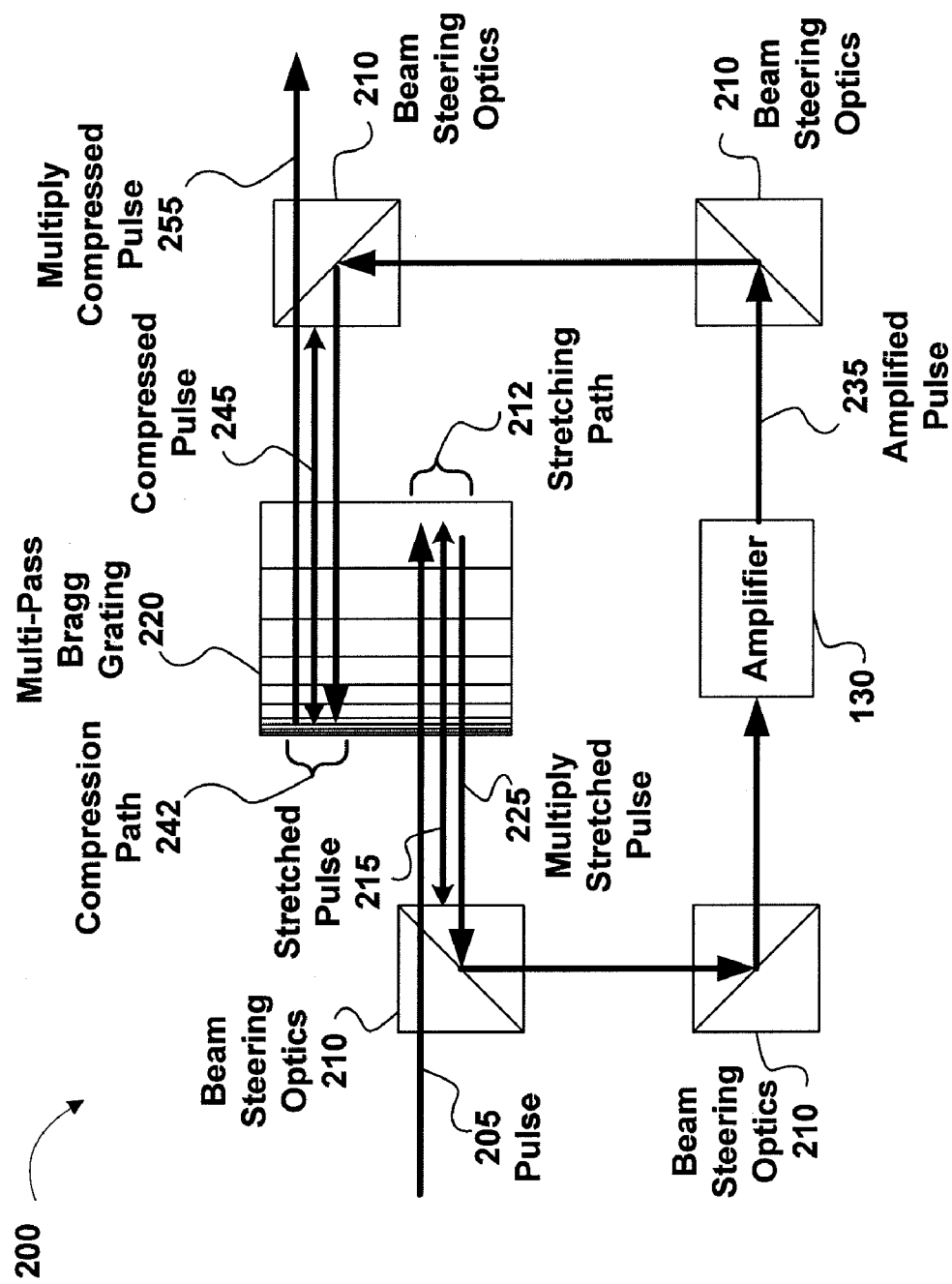
FIG. 2 is a block diagram illustrating a chirped pulse amplifier including a multi-pass Bragg grating in which the pulse is both stretched and compressed, according to various embodiments.

FIG. 2 is a block diagram illustrating part of chirped pulse system 100, according to various embodiments. These embodiments include a multi-pass Bragg grating in which the pulse is both stretched and compressed. In FIG. 2, a chirped pulse amplifier includes a single Bragg grating which is used for both stretching a pulse using multiple passes and for compressing a pulse using multiple passes. The path of the pulse through a multi-pass Bragg grating determines whether the pulse is stretched or compressed. The pulse may be directed through a multi-pass stretching path in the Bragg grating for stretching the pulse. Further, the pulse may be directed through a multi-pass compression path in the same Bragg grating resulting in compression of the pulse.

The embodiments illustrated in FIG. 2 include a chirped pulse amplifier 200 including a multi-pass Bragg grating 220 in which the pulse is both stretched and compressed, according to various embodiments. The chirped pulse amplifier 200 includes embodiments of the multi-pass stretcher 120, the amplifier 130 and the multi-pass compressor 140. Specifically, the chirped pulse amplifier 200 includes beam steering optic components 210, a multi-pass Bragg grating 220, and the amplifier 130. The multi-pass Bragg grating 220 is part of both multi-pass stretcher 120 and multi-pass compressor 140.

In the chirped pulse amplifier 200, a pulse 205, from pulse source 110, is directed through a stretching path 212 in the multi-pass Bragg grating 220 using one or more beam steering optics 210. In various embodiments, the beam steering optics 210 include beam splitters, optical fibers, phase rotators, prisms, reflectors, lenses, tapered fiber bundles, Bragg waveguides, optical combiners, and/or the like. The multi-pass Bragg grating 220 is configured to receive the pulse 205 and output a stretched pulse 215. The beam steering optics 210 are configured to further direct the stretched pulse 215 again into the stretching path 212 in the multi-pass Bragg grating 220 for additional stretching. After being stretched two or more times the multi-pass Bragg grating 220 outputs the stretched pulse 215 as a multiply-stretched pulse 225.

The multiply-stretched pulse 225 may be directed using one or more beam steering optics 210 to the amplifier 130. The amplifier 130 is configured to amplify the multiply stretched pulse 225 and output an amplified pulse 235, as described elsewhere herein. The amplified pulse 235 may be directed, using beam steering optics 210, to the multi-pass Bragg grating 220 for compression.

The beam steering optics 210 are further configured to direct the amplified pulse 235 into a compression path 242 in the multi-pass Bragg grating 220 for generating a compressed pulse 245, and to direct the compressed pulse 245 again into the compression path 242 in the multi-pass Bragg grating 220 for additional compression. After being compressed two or more times the compressed pulse 245 is output as a multiply-compressed pulse 255.

In FIG. 2, the pulse 205, the stretching path 212 and the compression path 242 are depicted as spatially offset for purposes of illustration. However, a practitioner with ordinary skill in the art will recognize that in some embodiments, there may not be a spatial offset between the stretching path 212 and the compression path 242 and that they may overlap within the multi-pass Bragg grating 220. In various embodiments, the multi-pass Bragg grating 220, the amplifier 130, the pulse source 110, and/or the one or more of the beam steering optics 210 may be mounted and/or fabricated on a wafer.

Figure 3:
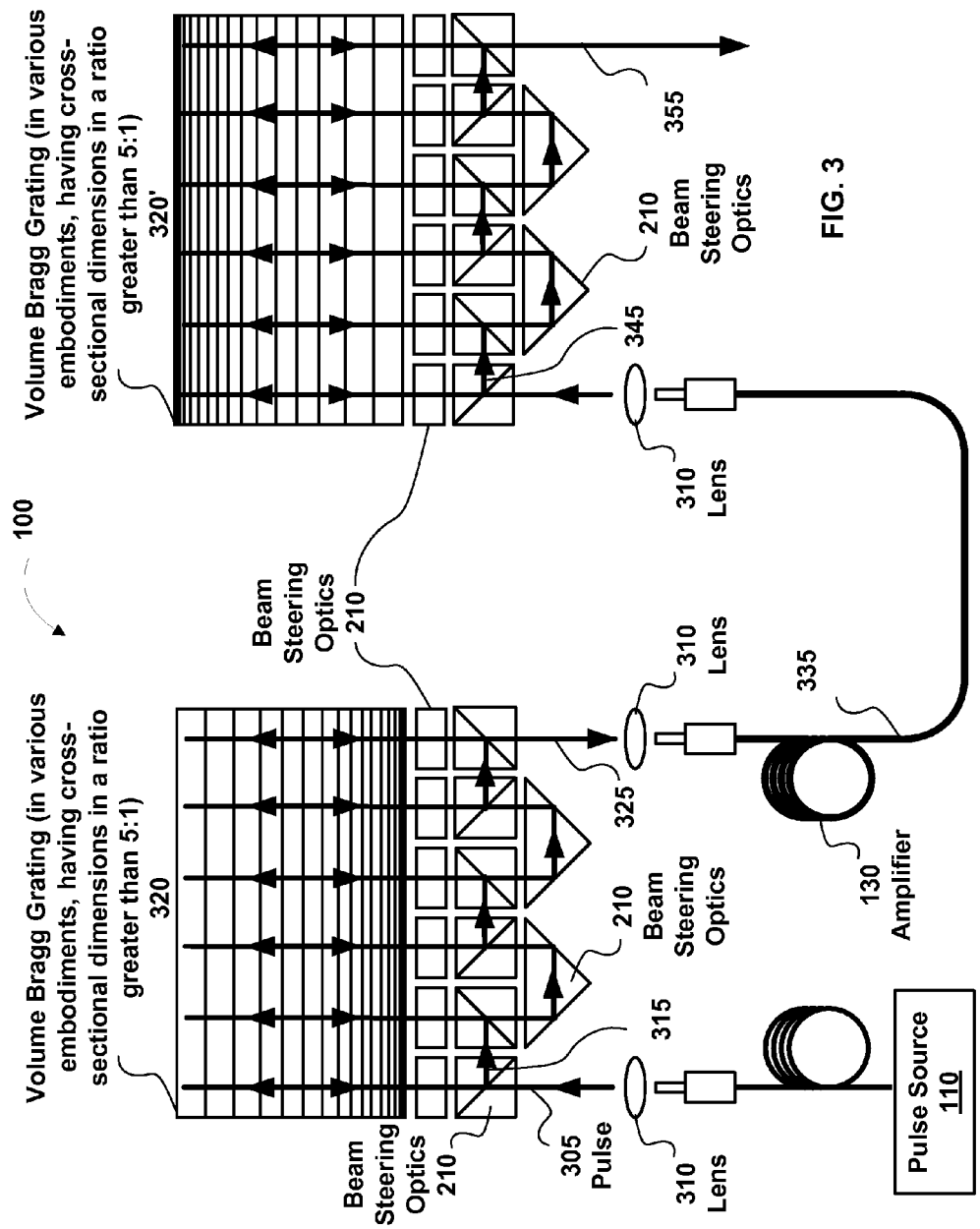
FIG. 3 is a block diagram of alternative embodiments of the chirped pulse amplifier of FIG. 1A, illustrating details of a multi-pass stretcher and a multi-pass compressor.

FIG. 3 is a block diagram of alternative embodiments of the chirped pulse amplifier of FIG. 1A, illustrating details of a multi-pass stretcher and a multi-pass compressor. In these embodiments, beam steering optics are used for directing a pulse through multiple paths within volume Bragg gratings to stretch and/or compress the pulse. In some embodiments, the multiple paths through a volume Bragg grating may be separated in space using the beam steering optics.

In the embodiment illustrated in FIG. 3, the multi-pass stretcher 120 includes an optional lens 310, beam steering optics 210, and an optional first volume Bragg grating 320 configured to stretch a pulse 305 multiple times. The multi-pass compressor 140 includes an optional lens(es) 310, beam steering optics 210 and a second optional volume Bragg grating 320' configured to compress an amplified pulse 335 multiple times. The pulse source 110 is configured to provide a pulse 305. The lens 310 may be used to configure the pulse 305 to converge or diverge. The pulse 305 may be directed to the first volume Bragg grating 320 using one or more beam steering optics 210. The first volume Bragg grating 320 is configured to receive the pulse 305 from the pulse source 110 and output a stretched pulse 315. The stretched pulse 315 may be directed, using the beam steering optics 210, into the first volume Bragg grating 320 again for additional stretching. The stretched pulse 315 may be further stretched one or more times in the first volume Bragg grating 320 and output as a multiply-stretched pulse 325.

The multiply-stretched pulse 325 may be directed using one or more beam steering optics 210 to the amplifier 130. The amplifier 130 is configured to amplify the multiply stretched pulse 325 and output an amplified pulse 335. The amplified pulse 335 may be directed, using beam steering optics 210 and/or a lens(es) 310, to the second volume Bragg grating 320'.

The second volume Bragg grating 320' is configured to receive the amplified pulse 335 from the amplifier 130 and output a compressed pulse 345. The compressed pulse 345 may be directed, using one or more beam steering optics 210, into the second volume Bragg grating 320' again for additional compression. The compressed pulse 345 may be further compressed one or more times in the second multi-pass Bragg Grating 320' and output as a multiply-compressed pulse 355.

In various embodiments, the volume Bragg gratings 320 and/or 320', the amplifier 130, pulse source 110, one or more lenses 310 and/or the one or more of the beam steering optics 210 may be mounted and/or fabricated on a wafer.

The volume Bragg gratings 320 and 320' are illustrated in FIG. 3 as single gratings. However, the volume Bragg gratings 320 and/or 320' may be configured as multiple gratings, configured to receive one or more passes of a pulse. In some embodiment, at least one of the volume Bragg gratings 320 and/or 320' is configured to receive two or more passes of a pulse.

Figure 4:
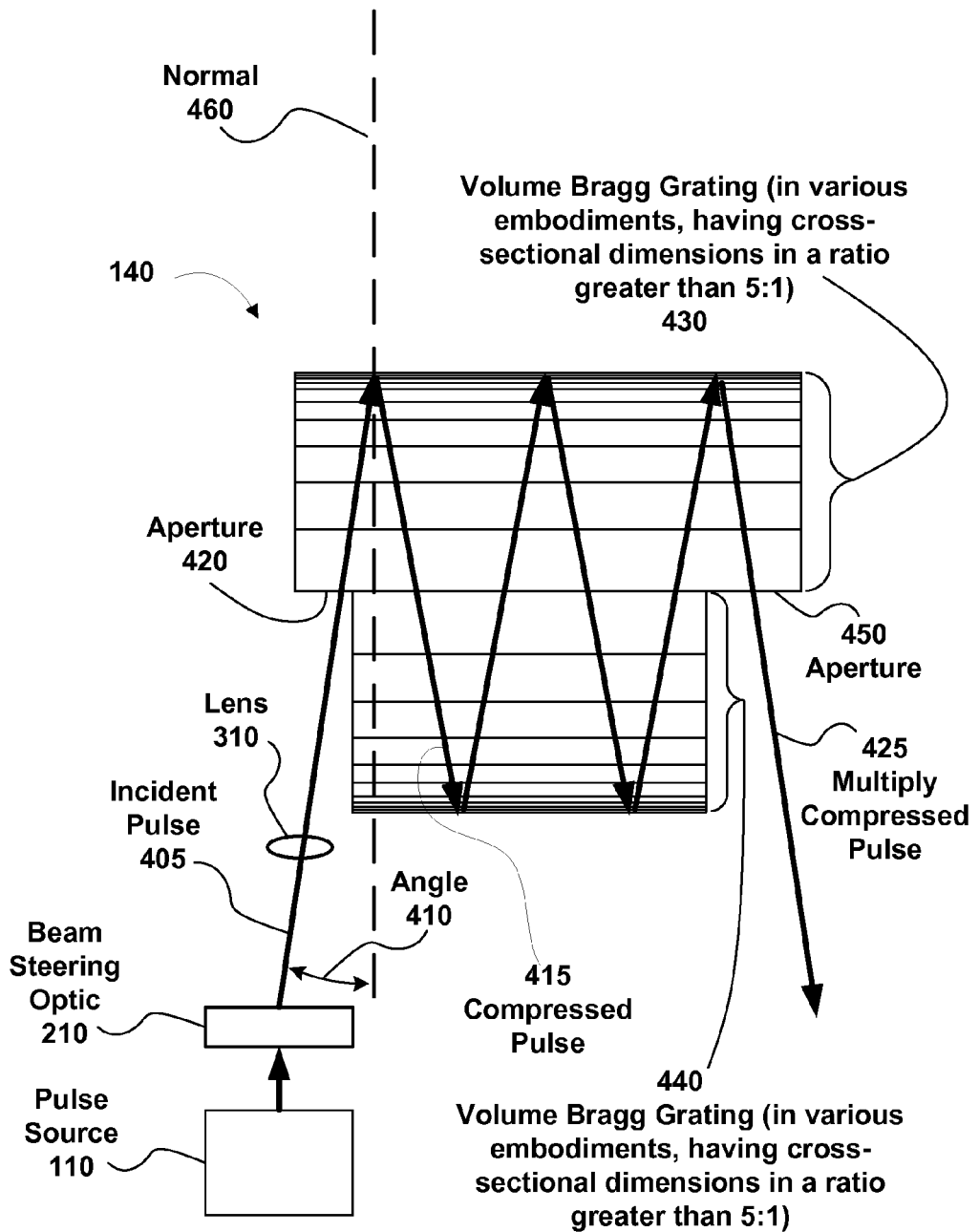
FIG. 4 is a block diagram illustrating further details of the multi-pass compressor of FIG. 1A, according to various embodiments including a multi-pass Bragg grating.

FIG. 4 is a block diagram illustrating further details of the multi-pass compressor 140 of FIG. 1A, according to various embodiments including a multi-pass Bragg grating. In these embodiments, a pulse is received by a volume Bragg grating at an incident angle configured such that the pulse passes through a path including multiple reflections along the interior of the volume Bragg grating. The number of reflections may be determined from the incident angle of the pulse and the width of the volume Bragg grating. A lens may be disposed in the path of the incident pulse and configured to provide for conditioning the pulse, e.g. adjusting convergence or divergence of the pulse.

In the embodiments illustrated by FIG. 4, the multi-pass compressor 140 includes beam steering optics 210, an optional lens 310, a volume Bragg grating 430, and an optional volume Bragg grating 440. The pulse source 110 is configured to emit an incident pulse 405 and the beam steering optics 210 are configured to direct the incident pulse 405 toward the volume Bragg grating 430 at an incident angle 410 with respect to a normal 460 to a plane of the volume Bragg grating 430. An optional lens 310 is configured to provide for divergence or convergence of the incident pulse 405.

The incident pulse 405 enters the volume Bragg grating 430 through an aperture 420. In some embodiments, the aperture 420 is normal to the incident pulse 405. In the volume Bragg grating 430, the incident pulse 405 is compressed to generate a compressed pulse 415. The optional volume Bragg grating 440 is configured to both further compress the compressed pulse 415 and to reflect the compressed pulse 415 into the volume Bragg grating 430 for additional compression. The compressed pulse 415 may undergo multiple reflections within the volume Bragg gratings 430 and 440, through an appropriate angle 410. With each reflection, the compressed pulse 415 is further compressed. The compressed pulse 415 may be emitted as a multiply compressed pulse 425 from the volume Bragg grating 430 at an aperture 450.

The number of reflections within the volume Bragg grating 430 may be dependent on the length of the volume Bragg grating 430 and/or the volume Bragg grating 440. A greater length will result in a greater number of reflections. In some embodiments, the volume Bragg grating 430 and the volume Bragg grating 440 may be configured to emit the multiply compressed pulse 425 from the volume Bragg grating 440 instead of 430. Thus, the length of the volume Bragg gratings 430 and/or 440 may be used to control the number of reflections.

The number of reflections within the volume Bragg grating 430 may also be dependent on the angle 410. A smaller angle 410 may result in a greater number of reflections. Thus, the number of the reflections of the compressed pulse 415, and therefore the width of the output pulse, may be tuned by adjusting the incident angle 410.

In some embodiments, a reflector is disposed in place of the volume Bragg grating 440. These embodiments optionally include a movable embodiment of aperture 450 disposed within the reflector. The number of reflections that a pulse experiences may be controlled by positioning the aperture 450. For example, the aperture 450 may be positioned such that the compressed pulse 415 is reflected nine times before reaching the aperture 450, or the aperture 450 may be positioned such that the compressed pulse 415 is reflected eleven times before reaching the aperture 450. In one embodiment, the aperture 450 is movable to select between one and thirty-five reflections. Thus, the number of reflections, and the amount of compression, can be controlled by positioning the aperture 450.

In FIG. 4, the volume Bragg gratings 430 and 440, as illustrated, are configured to compress the incident pulse 405. However, a one of ordinary skill in the art will recognize that the volume Bragg gratings 430 and 440 may be configured to stretch the pulse 405. In various embodiments, the volume Bragg grating 430 and/or 440, the lens 310, the beam steering optics 210, and/or the pulse source 110 may be mounted and/or fabricated on a wafer.

As illustrated in FIGS. 3 and 4, multiple passes within a Bragg grating may be accomplished by directing a pulse through multiple paths that are spatially separated, to stretch or compress the pulse. However, in some embodiments, the multiple paths through the Bragg grating may be separated in time instead of position. As illustrated in FIGS. 5A-5D, and 6, the separation in time of the multiple paths through the Bragg grating may be accomplished using a switch. Moreover, the switch may be used to select the number of passes through the Bragg grating, thus, determining the width of the stretched or compressed pulse. In various embodiments, a switch can be an optical switch, such as an acousto-optic modulator (AOM)

switch, an electro-optic modulator (EOM) switch, or a 2×2 switch, or a mechanical switch such as a movable micro mirror, and/or the like.

Figure 5A:
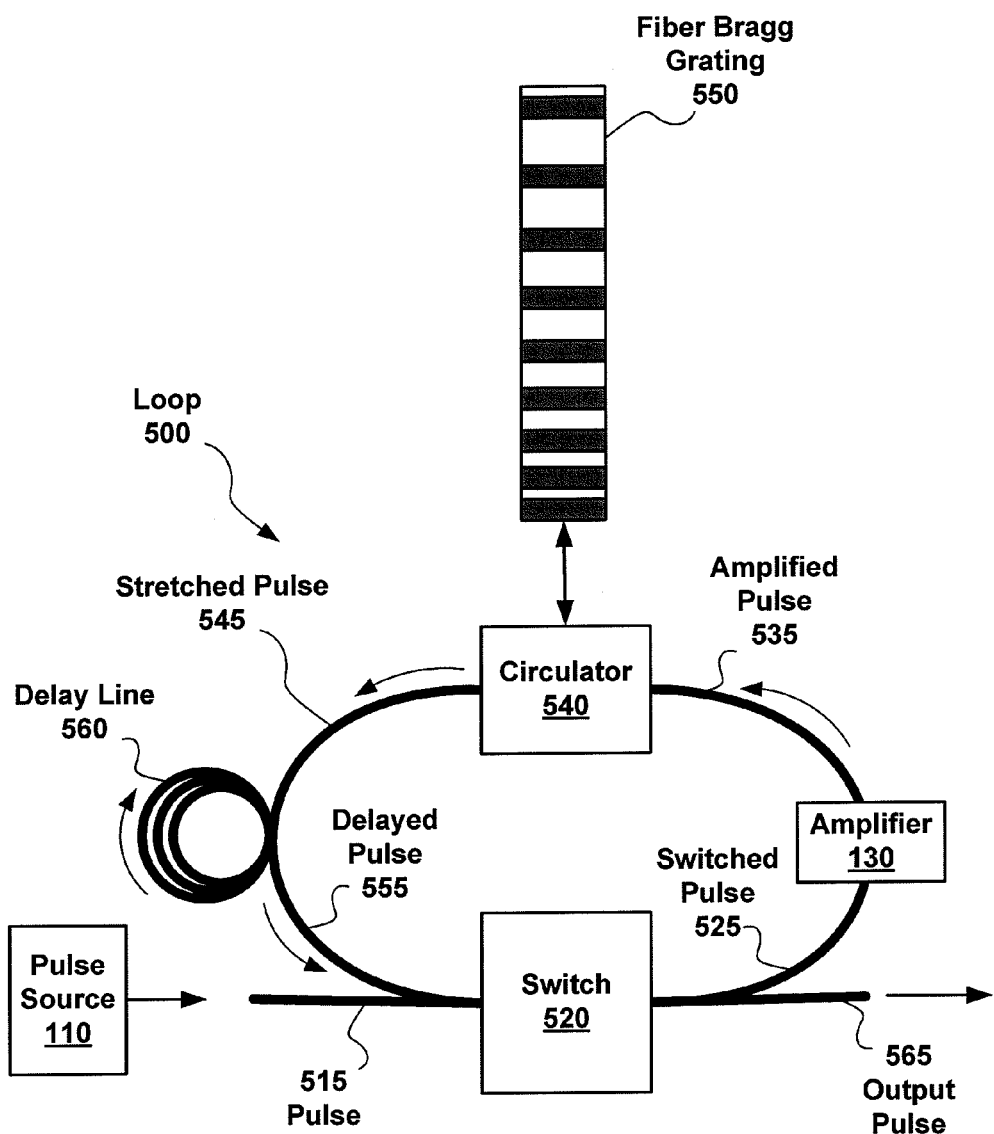
FIG. 5A is a block diagram illustrating further details of the multi-pass stretcher of FIG. 1A, according to various embodiments including a multi-pass loop.

FIG. 5A is a block diagram illustrating further details of the multi-pass stretcher 120 of FIG. 1A, according to various embodiments including a multi-pass loop 500. The loop 500 includes a switch 520, a circulator 540, a fiber Bragg grating 550, and an optional delay line 560. In some embodiments, amplifier 130 is included within loop 500. In other embodiments, amplifier 130 is separate from loop 500. The switch 520 is configured to receive a pulse 515 from the pulse source 110 and direct a switched pulse 525 to the amplifier 130. The amplifier may be configured to receive the switched pulse 525 and output an amplified pulse 535. The amplified pulse 535 may be directed to the circulator 540.

The circulator 540 is configured to direct the amplified pulse 535 into the fiber Bragg grating 550 or other Bragg grating. The fiber Bragg grating 550 is configured to receive the amplified pulse 535 from the circulator 540 and return a stretched pulse 545 to the circulator 540. The circulator 540 is further configured to direct the stretched pulse 545 to the delay line 560. The delay line 560 is configured to output a delayed pulse 555 to the switch 520.

The same pulse can be directed around the loop 500 (i.e., from the switch 520, through the amplifier 130, the circulator 540, the fiber Bragg grating 550 and the delay line 560) multiple times. For example, a delayed pulse received at the switch 520 can be directed again to the circulator 540. In each pass through the elements in the loop 500, the pulse is again (optionally) amplified by the amplifier 130, and further stretched as a result of being directed into and out of the fiber Bragg grating 550.

After one or more passes through the loop 500, the state of the switch 520 may be changed such that the delayed pulse 555 is directed as an output pulse 565, rather than towards the amplifier 130 and/or circulator 540. Thus, the switch 520 may be used to control the number of times the pulse is directed through the loop 500. In various embodiments, the switch 520 includes a counter, a timer, a sensor, and/or the like. The counter may be configured to count the number of times the compressed pulse is direct into the fiber Bragg grating 550. The timer may be used to measure a delay time between changes in the state of the switch 520. The amount of stretching applied to the pulse, and thus, the pulse width, can be tuned by controlling the number of times the pulse is directed through the elements in the loop 500. Thus, the output pulse width of the loop 500 may be tuned by opening or closing the switch 520 at appropriate times. For example, in some embodiments, the loop 500 is designed to stretch the pulse using from one to one hundred passes, such that the width of the output pulse 565 may be tunable to one hundred different pulse widths. The loop 500 may be configured for selection of more or fewer than one hundred passes.

In various embodiments, the loop 500 may be used to stretch the pulse at least 1, 2, 10, 30, 100, or more times. In some embodiments, the pulse is attenuated, for example two percent, with each pass through the loop 500. When the attenuation is two percent per pass, the pulse will be attenuated about fifty percent after thirty-four passes. However, the pulse may be amplified between passes, for example using the amplifier 130, to compensate, or more than compensate, for the attenuation.

In various embodiments, the pulses 515, 525, 535, 545, and/or 555 may be communicated between the switch 520, the amplifier 130, the circulator 540, the fiber Bragg grating 550, and/or the delay line 560 using beam steering optics described elsewhere herein. For example, a fiber optic, a high order mode fiber optic, and/or a tapered fiber bundle may be used to direct a pulse between any elements of the loop 500, e.g., the switch 520 and the amplifier 130, the amplifier 130 and the circulator 540, the circulator 540 and the fiber Bragg grating 550, the circulator 540 and the delay line 560, and/or the delay line 560 and the switch 520.

Figure 5B:
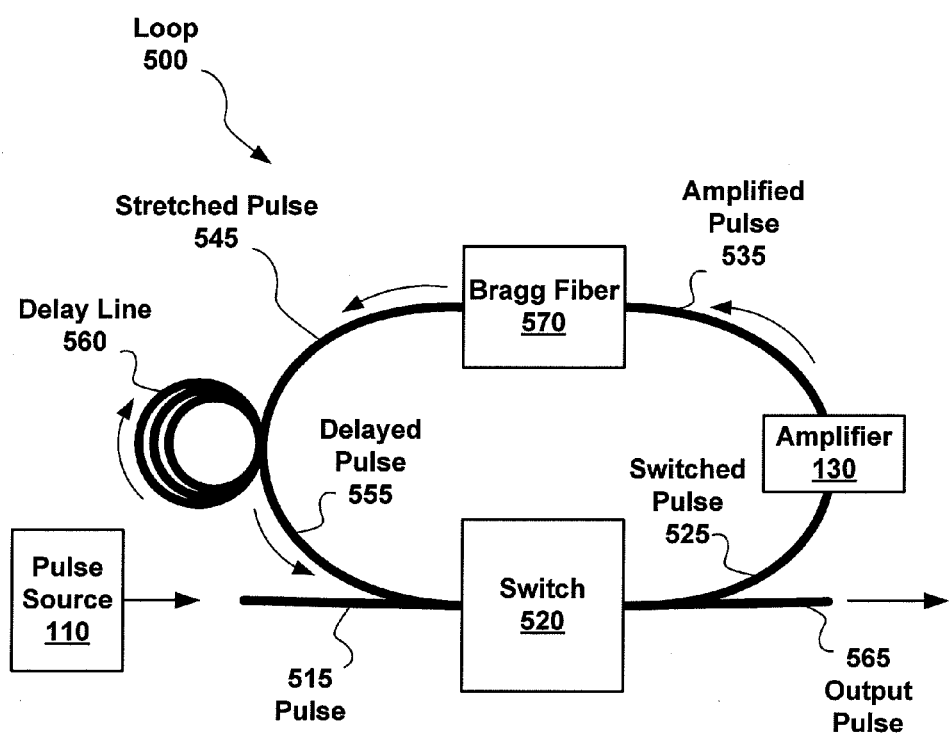
FIG. 5B is a block diagram illustrating further details of the multi-pass stretcher of FIG. 1A, according to various embodiments including a Bragg waveguide.

FIG. 5B is a block diagram illustrating further details of the multi-pass stretcher of FIG. 1A, according to various embodiments including a Bragg waveguide 570. FIG. 5B differs from FIG. 5A in that a Bragg waveguide 570 is used to stretch the pulse, instead of the circulator 540 and the fiber Bragg grating 550. In each pass through the elements in the loop 500, the pulse is further stretched as a result of passing through the Bragg waveguide 570, instead of being directed into the fiber Bragg grating 550 by the circulator 540.

Figure 5C:
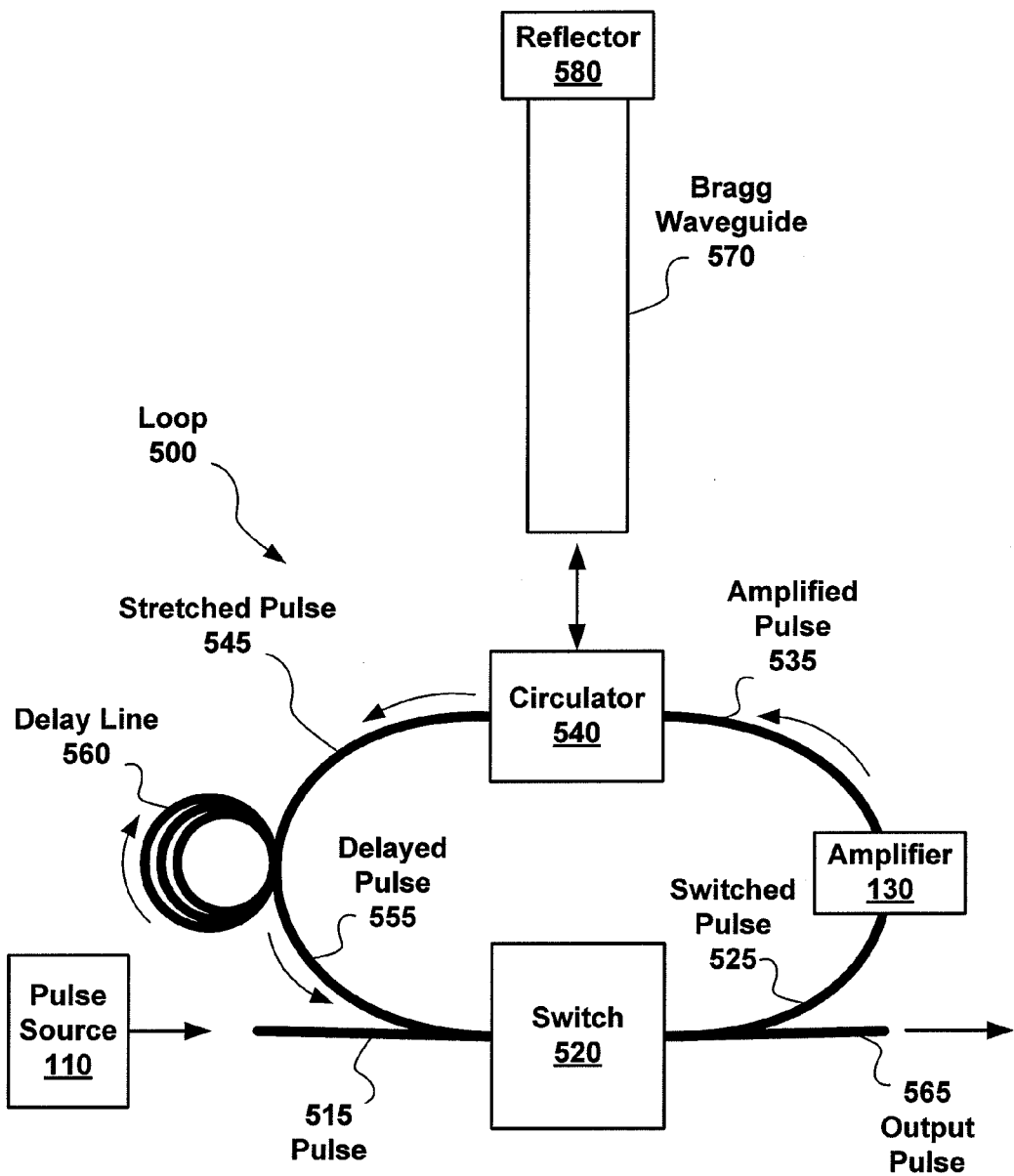
FIG. 5C is a block diagram illustrating further details of the multi-pass stretcher of FIG. 1A, according to various embodiments including a Bragg waveguide and a reflector.

FIG. 5C is a block diagram illustrating further details of the multi-pass stretcher of FIG. 1A, according to various embodiments including a Bragg waveguide 570 and a reflector 580. FIG. 5B differs from FIG. 5A in that a Bragg waveguide 570 and a reflector 580 is used to stretch the pulse, instead of the fiber Bragg grating 550. In each pass through the elements in the loop 500, the pulse is further stretched as a result of being directed into the fiber Bragg waveguide 570 by the circulator 540. The reflector 580 may return the pulse back through the Bragg waveguide 570 to the circulator 540.

In FIGS. 5A-5C, the fiber Bragg grating 550 and Bragg waveguide are used configured to stretch a pulse. However, one of ordinary skill in the art will recognize that the fiber Bragg grating 550 may be configured to compress a pulse. Moreover, the pulse may be compressed multiple times in one Bragg grating for fine adjustment and compressed a large amount one time in another Bragg grating for a coarse adjustment. Embodiments of the loop 500 that are configured to compress a pulse typically do not include the amplifier 130.

Figure 5D:
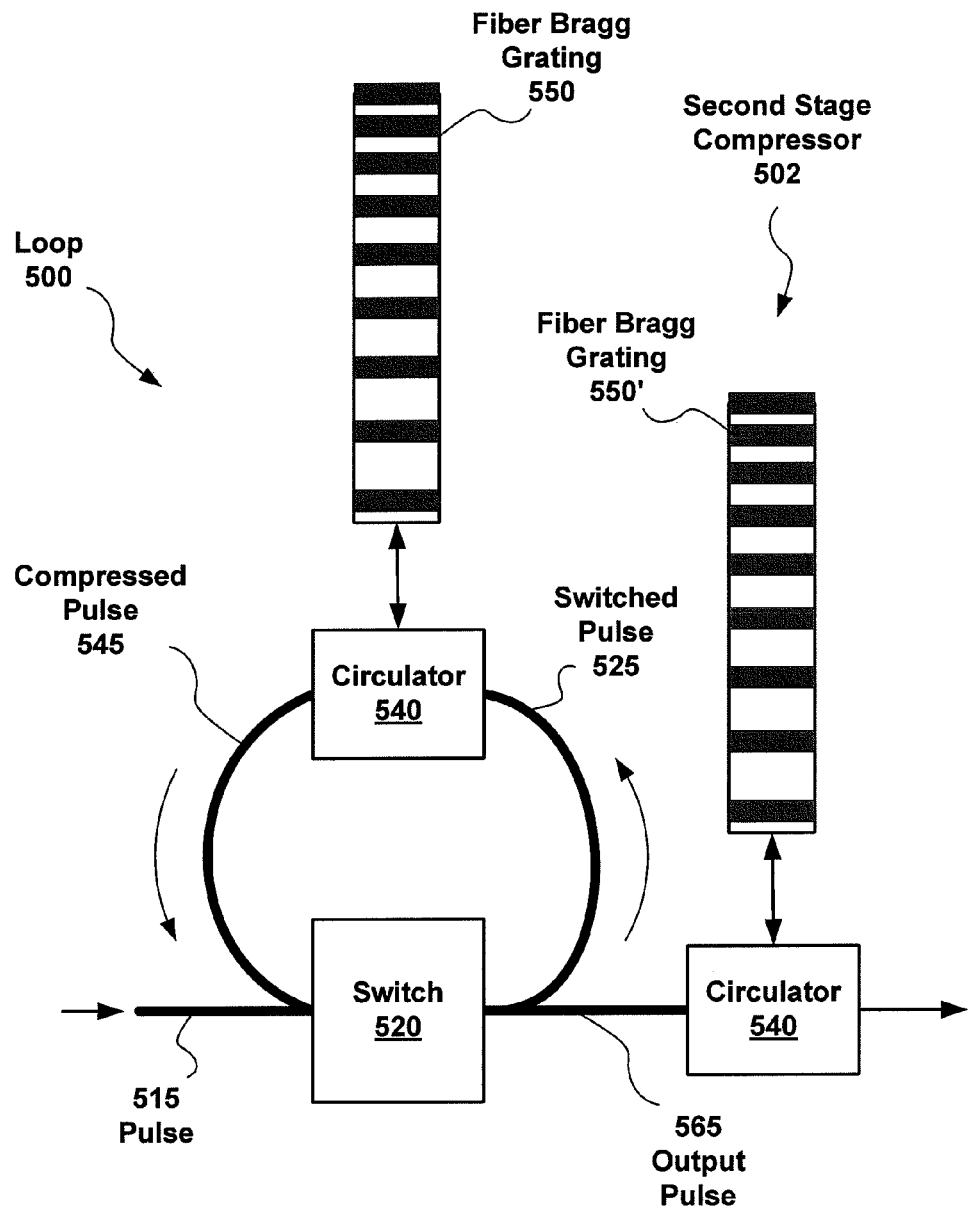
FIG. 5D is a block diagram illustrating further details of the multi-pass stretcher of FIG. 1A, according to various embodiments including a Bragg waveguide and a reflector.

FIG. 5D is a block diagram illustrating details of the tunable multi-pass compressor 150 and second stage compressor 160 of FIG. 1B, according to various embodiments including a multi-pass loop 500. FIG. 5D differs from FIG. 5A in that the embodiments of loop 500 illustrated are configured to compress the pulse instead of stretch the pulse, and a second stage compressor 502 comprising a fiber Bragg grating 550' is configured for further compressing the output pulse 565. FIG. 5D further differs from FIG. 5A in that the optional amplifier 130 and the optional delay line 560 are omitted. In these embodiments, the loop 500 includes the switch 520, the circulator 540, and the fiber Bragg grating 550. The loop 500 may further include the delay line 560 when configured for compressing a pulse.

The pulse can be compressed multiple times. The same pulse can be directed around the loop 500 (i.e., from the switch 520, through the circulator 540, the fiber Bragg grating 550 and back to the switch 520) multiple times. For example, a pulse received at the switch 520 can be directed again to the circulator 540. In each pass through the elements in the loop 500, the pulse again is directed into and out of the fiber Bragg grating 550 and thus, further compressed. After one or more passes through the loop 500, the state of switch 520 may be changed such that the compressed pulse 545 is directed as an output pulse 565, rather than towards the circulator 540.

The compression of the pulse may be tunable. The amount of compressing experienced by the pulse, and thus, the pulse width, can be tuned by controlling the number of times the pulse is directed through the loop 500, using the switch 520. Thus, the output pulse width of the loop 500 may be tuned by opening or closing the switch 520 at appropriate times. For example, in some embodiments, the loop 500 may be designed to compress the pulse using from one to one hundred passes, such that the width of the output pulse 565 may be tunable to one hundred available pulse widths. The loop 500 may be configured for selection of more or fewer than one hundred passes.

In various embodiments, the loop 500 may be used to compress the pulse at least 1, 2, 10, 30, 100, or more times. In some embodiments, the pulse is attenuated, for example two percent, each pass through the loop 500. When the attenuation is two percent per pass, the pulse will be attenuated about fifty percent after thirty-four passes.

Coarse and fine adjustment may be used to control the output pulse width. The second stage compressor 502 comprises a circulator 540 and the fiber Bragg grating 550' and is disposed to compress the output pulse 565. In some embodiments, the fiber Bragg grating 550' in the second stage compressor 502 is configured to compress the pulse by a greater degree than a single pass through the fiber Bragg grating 550 in the loop 500. Thus, the loop 500 may be used for fine adjustment of the compression of the pulse, whereas the second stage compressor 502 may be used for large scale compression of the pulse. In some embodiments, a multi-pass Bragg grating (e.g., a volume Bragg grating) may be used in the second stage compressor 502 instead of the fiber Bragg Grating 550', for greater compression of the output pulse 565.

In some embodiments, a volume Bragg grating, Bragg waveguide, or other Bragg grating may be substituted for the fiber Bragg grating 550 and/or the fiber Bragg grating 550'. In various embodiments, the switch 520, the amplifier 130, the circulator 540, the fiber Bragg grating 550, the delay line 560, the pulse source 110, and/or beam steering optic components may be mounted and/or fabricated on a wafer.

Figure 6:
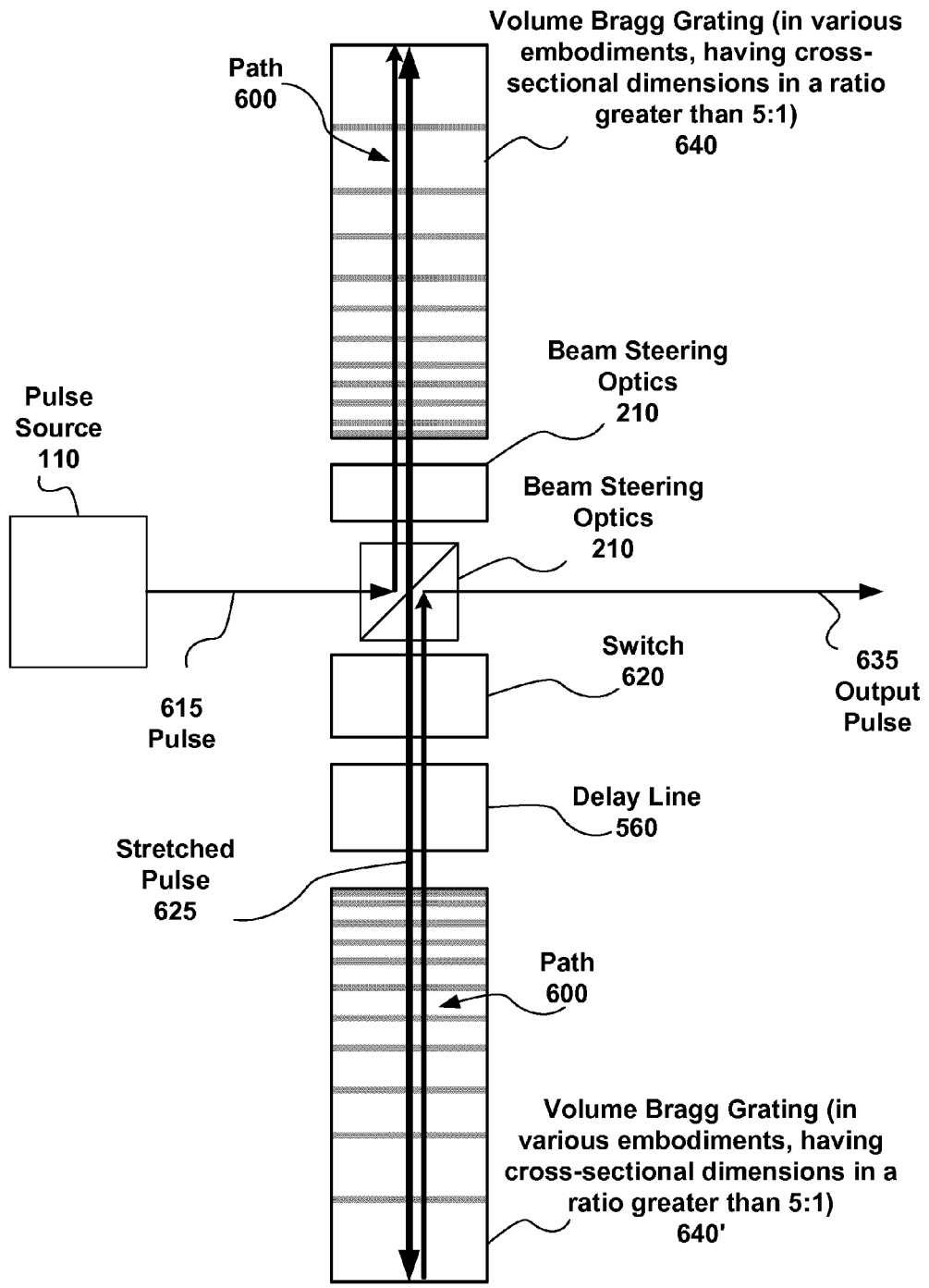
FIG. 6 is a block diagram illustrating alternative embodiments of a fiber Bragg grating used for stretching a pulse.

FIG. 6 is a block diagram illustrating details of the multi-pass stretcher 120 of FIG. 1A, including one or more multi-pass path 600, according to various embodiments. The multi-pass stretcher 120 includes one or more beam steering optics 210, a volume Bragg grating 640, a switch 650, an optional delay line 560 and an optional volume Bragg grating 640', which may be disposed to form the path 600 for a pulse 615. In some embodiments, the volume Bragg grating 640 and/or 640' could be replaced by a fiber Bragg grating or any other Bragg waveguide. The beam steering optic 210 is configured to receive the pulse 615 from the pulse source 110 and direct the pulse 615 to the volume Bragg grating 640. The volume Bragg grating 640 may be configured to stretch the pulse 615 and return a stretched pulse 625, via the beam steering optics 210, the switch 650, and the delay line 560, to the volume Bragg grating 640'. The volume Bragg grating 640' may further stretch the stretched pulse 625 and return the stretched pulse 625 to the switch 650 via the delay line 560. In some embodiments, the volume Bragg grating 640 is replaced by a reflecting element. In these embodiments, Volume Bragg grating 640 may be used alone to stretch the Pulse 615.

The stretched pulse 625 may be directed through the path 600 multiple times in a first state of the switch 650, thus, producing a multiply stretched pulse. For example, the switch 650 may direct the stretched pulse 625 through the path 600 to the volume Bragg grating 640 again. In a second state of the switch 650, the stretched pulse 625 is directed out of the path 600 as an output pulse 635. In some embodiments, the switch 650 is configured to adjust the polarization of the pulse in order to control whether it is again directed into the volume Bragg grating 640 or directed as output. In each pass through the path 600, the stretched pulse 625 is again directed in and out of the volume Bragg grating 640 and 640' and thus, further stretched. The delay line 560 may be used to control distortion as the length of the stretched pulse 625 increases. In some embodiments, the embodiments of the multi-pass stretcher 120 illustrated in FIG. 6 can include an embodiment of Amplifier 130 configured to amplify the stretched pulse 625 between passes though the volume Bragg grating 640 and/or volume Bragg grating 640'.

The width of the output pulse 635 may be tunable. For example, the amount of further stretching applied to the stretched pulse 625, and thus, the width of the output pulse 635, can be tuned by controlling the number of times the stretched pulse 625 is directed through the elements in the path 600. Thus, the output pulse width of the path 600 may be tuned by changing the states of the switch 650 at appropriate times. For example, the path 600 may be configured to stretch the pulse 615 using from one to one hundred passes such that the width of the output pulse 635 may be tunable to select one of one hundred available pulse widths. The switch may be configured for selection from more or fewer than one hundred passes.

In various embodiments, the stretched pulse 625 may be directed between the switch 650, the volume Bragg grating 640 and 640', and/or the delay line 560 using beam steering optics 210 described elsewhere herein. In some embodiments, an optic fiber, for example a tapered fiber bundle, may be used to direct a pulse between any elements of the path 600, e.g., the switch 650, the volume Bragg grating 640 and 640', the delay line 560 and/or other beam steering optics 210.

In FIG. 6, the volume Bragg grating 640 and/or 640' are illustrated as configured to stretch the pulse 615. However, a practitioner with ordinary skill in the art will recognize that the volume Bragg grating 640 and/or 640' may be configured to compress the pulse 615 in the path 600 instead of stretch the pulse 615. Moreover, such a path 600 configured to compress a pulse may be coupled to a second stage compressor, such as that illustrated in FIG. 5D.

In some embodiments, a volume Bragg grating or Bragg waveguide plus a reflector may be substituted for the volume Bragg grating 640 and/or 640'. In various embodiments, the volume Bragg grating 640 and/or 640', the switch 650, the delay line 560, the beam steering optics 210 and/or the pulse source 110 may be mounted and/or fabricated on a wafer.

Various embodiments include methods for stretching or compressing a pulse including directing the pulse through a Bragg grating multiple times. The multiple passes through the Bragg grating result in further stretching or compression of the pulse to create multiply stretched or multiply compressed pulses.

Figure 7:
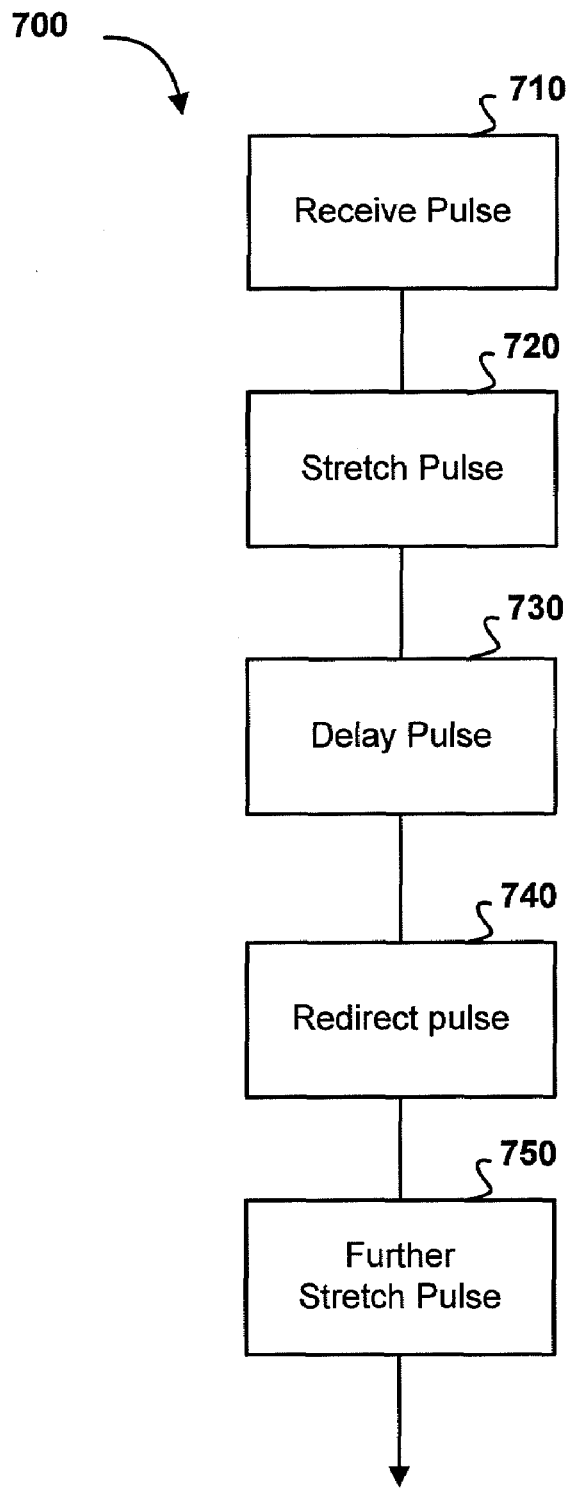
FIG. 7 is a flow diagram illustrating methods for stretching a pulse, according to various embodiments.

FIG. 7 is a block diagram illustrating a method 700 for stretching a pulse, according to various embodiments. In step 710 a pulse is received by a Bragg grating (e.g., the fiber Bragg grating 550, the volume Bragg grating 320, Bragg waveguide 570, and/or the like) from a pulse source. Beam steering optics (e.g., the beam steering optics 210) may be used to direct the pulse to the Bragg grating. In some embodiments, the beam steering optics include a lens configured to produce a converging or diverging pulse. In various embodiments, the beam steering optics are configured to rotate the pulse, split the pulse, amplify the pulse, delay the pulse, switch the pulse, reflect the pulse, modify polarization of the pulse, and/or the like.

In step 720, a pulse (e.g., pulse 205) is stretched by a Bragg grating (e.g., Bragg grating 220) to produce a stretched pulse 215. Optionally, the path that the pulse follows (e.g., the stretching path 212 or the compression path 242) into and out of the Bragg grating 220 determines whether the pulse is stretched compressed. The beam steering optics (e.g., beam steering optics 210) are configured to direct the pulse into the stretching path 212 through the Bragg grating 220 to stretch the pulse 205.

In some embodiments, the length of the stretched pulse 215 may approach the length of the stretching path 212 into and out of the Bragg grating 220 as the stretched pulse 215 is stretched. In optional step 730, the stretched pulse 215 is delayed to avoid distortion, truncation and/or the like. In some embodiments, the step 730 further includes amplifying the stretched pulse 215. In some embodiments, the amount of stretching possible is limited by a length of a delay line, such as delay line 560. Alternatively, the stretched pulse 215 is amplified instead of delayed in step 730.

In step 740, the stretched pulse 215 is redirected to the Bragg grating 220 using beam steering optics 210. The stretched pulse 215 is redirected to the stretching path 212 through the Bragg grating 220 configured to stretch the stretched pulse 215 again.

In step 750, the stretched pulse 215 is stretched further using the Bragg grating 220, to produce a multiply stretched pulse. In some embodiments, the method 700 includes further stretching the stretched pulse 215 in the same Bragg grating 220. For example, in a volume Bragg grating 220 multiple paths of the stretched pulse 215 through the Bragg grating 220 can be separated spatially. The beam steering optics 210 may be used to provide the spatial separation of the paths. In another embodiment, the multiple paths of the stretched pulse 215 through a fiber Bragg grating 220 may be separated in the time domain, using beam steering optics 210, including a switch, e.g. the switch 520 illustrated in FIG. 5A. In some embodiments, the method 700 includes directing the stretched pulse 215 into separate Bragg gratings 220.

Although the method 700 for stretching a pulse is described as being comprised of various steps (e.g., receiving a pulse 710, stretching the pulse 720, delaying the pulse 730, redirecting the pulse 740, and further stretching the pulse 750), fewer or more steps may comprise the method 700 and still fall within the scope of various embodiments. For example, steps 730-750 may be repeated multiple times.

Figure 8:
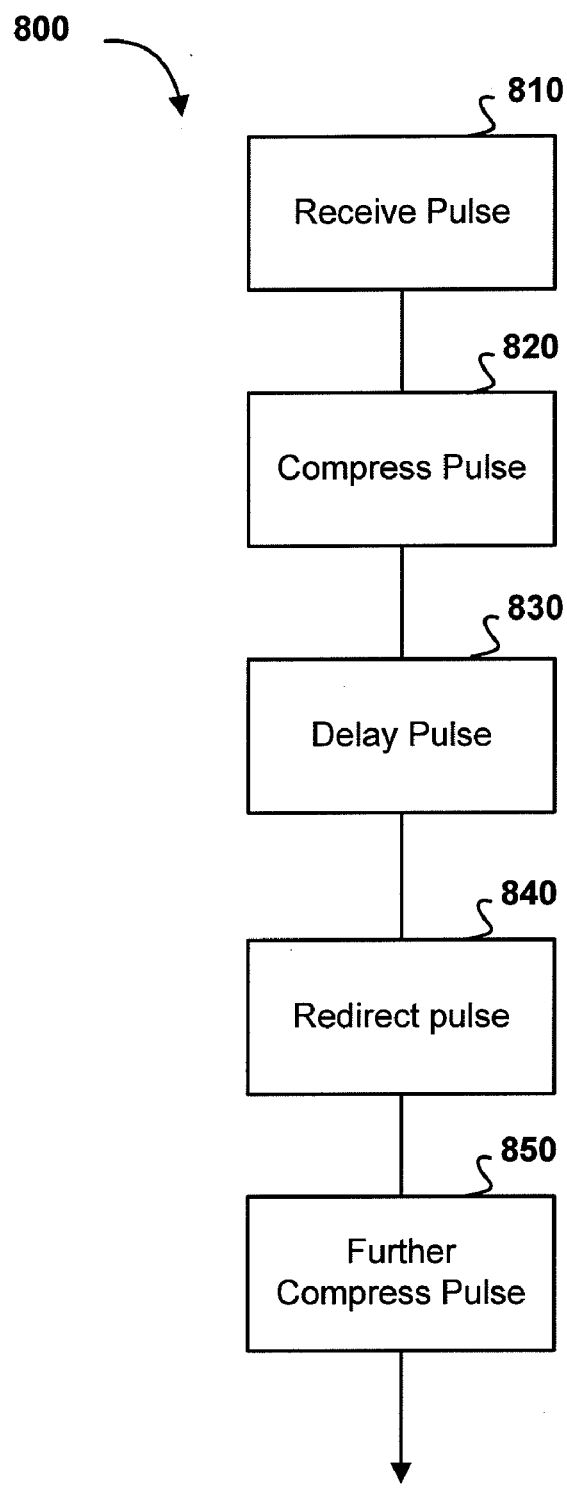
FIG. 8 is a flow diagram illustrating methods for compressing a pulse, according to various embodiments.

FIG. 8 is a block diagram illustrating a method 800 for compressing a pulse through spatially separated multiple paths, according to one embodiment. The steps 810-850 are similar to the steps 710-750 respectively, except that the pulse is compressed instead of stretched.

In step 810, a pulse (e.g., the pulse 235) is received by the Bragg grating 220. In step 820, the pulse 235 is compressed by the Bragg grating 220. The beam steering optics 210 are configured to direct the pulse 235 through the compression path 242 in the Bragg grating 220.

In optional step 830, a compressed pulse, e.g., the compressed pulse 245 is delayed. In step 840, the compressed pulse 245 is redirected, using the beam steering optics 210, to the compression path 242 through the Bragg grating 220 for further compression. In step 850, the compressed pulse 245 is further compressed using the Bragg grating 220, to generate a multiply compressed pulse. In some embodiments, the pulse 235 can be compressed by the same Bragg grating 220 used for stretching an input pulse 205, using the beam steering optics 210 to select the stretching path 212 or the compression path 242, as described elsewhere herein. In some embodiments, the amount of compression that is possible is limited by the length of a delay line, such as delay line 560.

Although the method 800 for stretching a pulse is described as being comprised of various steps (e.g., receiving a pulse in step 810, compressing the pulse in step 820, delaying the pulse in step 830, redirecting the pulse in step 840, and further compressing the pulse in step 850), fewer or more steps may comprise the method 800 and still fall within the scope of various embodiments. For example, the steps 840 and 850 may be repeated multiple times.

Figure 9:
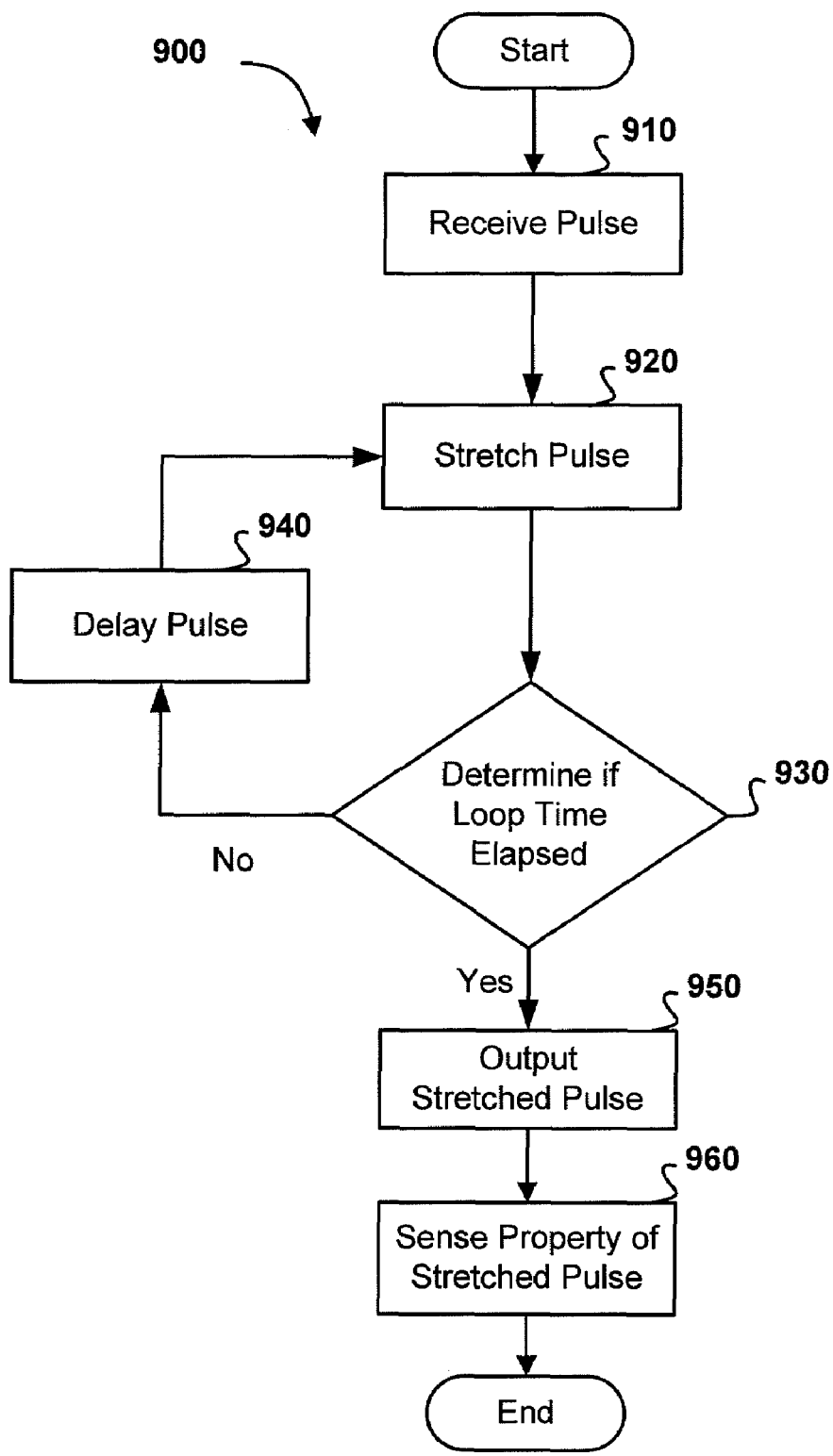
FIG. 9 is a block diagram of a method of tuning the stretching of a pulse, according to various embodiments.
Figure 10:
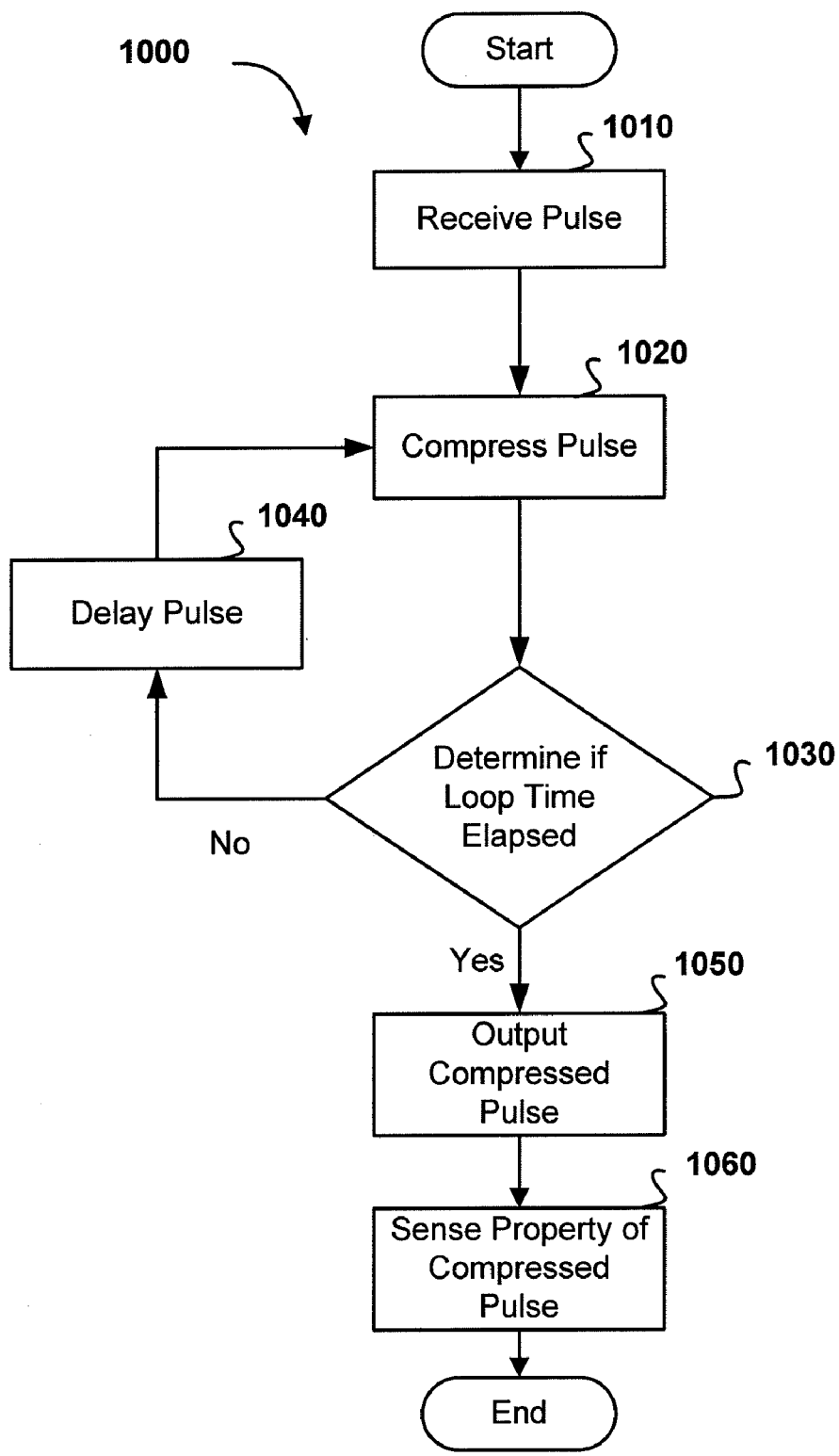
FIG. 10 is a block diagram of a method of tuning the compression of a pulse, according to various embodiments.

In FIGS. 9 and 10, the width of a stretched or compressed pulse may be tuned by turning a switch on or off at appropriate times. For example, the number of passes through a grating for stretching or compressing the pulse may be controlled using the switch to direct the pulse into the grating multiple times, or away from the grating. Thus, the switch can be used to control the width of the stretched or the compressed pulse.

FIG. 9 is a block diagram of a method 900 of tuning the stretching of a pulse, according to various embodiments. In a step 910, a pulse (e.g., the pulse 515) is received by a fiber Bragg grating (e.g., the fiber Bragg grating 550). The pulse 515 may be directed to the fiber Bragg grating using beam steering optics 210. In a step 920, the pulse 515 is stretched using the fiber Bragg grating 550.

A step 930 includes determining if a loop time has elapsed. The loop time is a time a pulse has been in a loop such as loop 500. The longer the loop time, more times a pulse will have passed through a Bragg grating configured to stretch the pulse. Thus, the longer the loop time, the greater the stretching that will occur. For example, a timer may be coupled to the switch 520 and set to change the state of the switch 520 after a predetermined loop time has elapsed. If the loop time has not elapsed, the stretched pulse 545 is directed, e.g., using the switch 520, to be stretched again.

In the optional step 940, the stretched pulse 545 is delayed. As the length of the stretched pulse increases, as a result of multiple stretching steps, the delay may be useful in accommodating longer stretched pulses 545 from the fiber Bragg grating 550 and/or associated beam steering optics 210 to prevent truncation of the stretched pulse 545 when the switch 520 is changed to direct the stretched pulse 545 as output. In some embodiments, the step 940 further includes amplifying the stretched pulse 545. Alternatively, the stretched pulse 545 is amplified instead of delayed in step 940.

After the delay and/or amplification at step 940, the stretched pulse 545 may be stretched again in step 920, to generate a multiply stretched pulse. Optionally, step 940 is omitted and the stretched pulse 545 is stretched again at step 920, directly after step 930. The stretched pulse 545 may be stretched multiple times in a loop comprising the steps 920, 930, and 940.

If the loop time has elapsed at step 930, the switch 520 may change state and the stretched pulse 545 is output at step 950. In an optional step 960, a sensor determines a property of the output pulse. In various embodiments, the property determined by the sensor in step 960 includes the length of the stretched pulse 545, the intensity of the stretched pulse 545, the power of the stretched pulse 545, a wavelength of the stretched pulse 545, and/or the like. Optionally, the loop time is changed based on the property determined in step 960.

Although the method 900 for stretching a pulse is described as being comprised of various steps (e.g., receiving a pulse in step 910, stretching the pulse in step 920, determining if the loop time has elapsed in step 930, delaying the pulse in step 940, outputting the pulse in step 950), and sensing a property of the stretched pulse in step 960, fewer or more steps may comprise the method 900 and still fall within the scope of various embodiments.

FIG. 10 is a block diagram illustrating a method 1000 of tuning the compression of a pulse, according to various embodiments. The steps 1010-1060 are similar to the steps 910-960 respectively, except where the method 1000 of FIG. 10 differs from the method of FIG. 9 in that the pulse is compressed instead of stretched, using multiple passes through s Bragg grating.

Although the method 1000 for compressing a pulse is described as being comprised of various steps (e.g., receiving a pulse 1010, compressing the pulse 1020, determining if the pulse length is correct 1030, delaying the pulse 1040, and outputting the pulse 1050), fewer or more steps may comprise the method 1000 and still fall within the scope of various embodiments. For example, steps 1020-1050 may be used for fine compression adjustment and a second stage compressor may follow step 1050 for coarse compression.

Several embodiments are specifically illustrated and/or described herein. However, it will be appreciated that modifications and variations are covered by the above teachings and within the scope of the appended claims without departing from the spirit and intended scope thereof. For example, the Bragg grating can be tuned mechanically, thermally, or using a piezo device. For example optically compression or expansion devices other than Bragg gratings may be used. Further, the systems and methods disclosed herein with reference to stretching a pulse may be adapted by one of ordinary skill in the art to compressing a pulse. Likewise, the systems and methods disclosed herein with reference to compressing a pulse may be adapted by one of ordinary skill in the art to stretching a pulse. For example, those examples including a fiber Bragg grating or volume Bragg grating may be adapted by reversing direction of the grating. Those examples including a Bragg waveguide may be adapted by changing the characteristics of the Bragg waveguide. The systems and methods described herein may be adapted to other types of pulse stretching and compressing optics, other than Bragg gratings.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A laser system comprising:
a source configured to emit a pulse;
a Bragg grating configured to receive the pulse and compress the pulse to generate a compressed pulse, the Bragg grating including a volume Bragg grating having cross-sectional dimensions in a ratio greater than 5:1; and
beam steering optics configured to direct the compressed pulse into the Bragg grating one or more times to further compress the compressed pulse.

2. The system of claim 1, wherein the Bragg grating includes a fiber Bragg grating.

3. The system of claim 1, wherein the Bragg grating includes a Bragg waveguide.

4. The system of claim 1, wherein the Bragg grating is disposed on a wafer.

5. A laser system comprising:
a source configured to emit a pulse;
a Bragg grating configured to receive the pulse and stretch the pulse to generate a stretched pulse, the Bragg grating including a volume Bragg grating having cross-sectional dimensions in a ratio greater than 5:1; and
beam steering optics configured to direct the stretched pulse into the Bragg grating one or more times to further stretch the stretched pulse.

6. The system of claim 5, further comprising a lens configured to control divergence of the stretched laser pulse.

7. The system of claim 5, further comprising an amplifier configured to amplify the stretched pulse between generating the stretched pulse and directing the stretched pulse into the Bragg grating the one or more times.

8. The system of claim 5, wherein the beam steering optics are configured to direct the stretched pulse around a loop.

9. A system comprising:
a volume Bragg grating configured to receive a laser pulse, the volume Bragg grating having cross-sectional dimensions in a ratio greater than 5:1; and
beam steering optics configured to
direct the laser pulse into the volume Bragg grating two or more times, each of the two or more times being to compress the laser pulse, or
direct the laser pulse into the volume Bragg grating two or more times, each of the two or more times being to stretch the laser pulse.

10. The system of claim 9, wherein the beam steering optics are configured to direct the laser pulse into the volume Bragg grating two or more times, each of the two or more times being to compress the laser pulse.

11. The system of claim 9, wherein the beam steering optics are configured to direct the laser pulse into the volume Bragg grating two or more times, each of the two or more times being to stretch the laser pulse.

12. The system of claim 9, wherein the beam steering optics are adjustable to control a number of times the laser pulse is directed into the volume Bragg grating and thereby control an amount of stretching or an amount of compression experienced by the laser pulse.

13. A method comprising:
receiving a pulse in a Bragg grating, the Bragg grating including a volume Bragg grating having cross-sectional dimensions in a ratio greater than 5:1;
compressing the pulse using the Bragg grating to generate a compressed pulse;
directing the compressed pulse into the Bragg grating; and
further compressing the compressed pulse one or more times using the Bragg grating to generate a multiply compressed pulse.

14. The method of claim 13, further including controlling the temporal dispersion caused by the Bragg grating by stretching the Bragg grating using a mechanical stretcher or a temperature controller.

15. The method of claim 13, wherein the Bragg grating includes a Bragg waveguide.

16. A method comprising:
receiving a pulse in a Bragg grating, the Bragg grating including a volume Bragg grating having cross-sectional dimensions in a ratio greater than 5:1;
stretching the pulse using the Bragg grating to generate a stretched pulse;
directing the stretched pulse into the Bragg grating; and
further stretching the stretched pulse one or more times using the Bragg grating to generate a multiply stretched pulse.

17. The method of claim 16, further comprising amplifying the multiply stretched pulse to generate an amplified multiply stretched pulse.

18. The method of claim 17, further comprising compressing the amplified multiply stretched pulse by directing the amplified multiply stretched pulse into the Bragg grating multiple times.

19. The method of claim 17, further comprising compressing the amplified multiply stretched pulse by directing the amplified multiply stretched pulse into another Bragg grating multiple times.

20. The method of claim 17, further comprising compressing the amplified multiply stretched pulse by directing the amplified multiply stretched pulse into a volume Bragg grating.

21. A method comprising:

receiving a pulse in a first Bragg grating;

stretching the pulse using the first Bragg grating two or more times to generate a multiply stretched pulse;

amplifying the multiply stretched pulse to generate an amplified pulse; and compressing the amplified pulse two or more times using a second Bragg grating, at least one of the first Bragg grating or the second Bragg grating including a volume Bragg grating having cross-sectional dimensions in a ratio greater than 5:1.

22. The method of claim 21, wherein the second Bragg grating includes a volume Bragg grating.

23. The method of claim 21, wherein the second Bragg grating includes a Bragg waveguide.

* * * * *

UNITED STATES PATENT AND TRADEMARK OFFICE
CERTIFICATE OF CORRECTION

PATENT NO.       : 7,444,049 B1
APPLICATION NO.  : 11/615883
DATED            : October 28, 2008
INVENTOR(S)      : Kyungbum Kim et al.

It is certified that error appears in the above-identified patent and that said Letters Patent is hereby corrected as shown below:

Title Page

Item (75) is to be corrected to read --Kyungbum Kim, Cotati, CA (US); Laurent Vaissié, Oviedo, FL (US); Robert G. Waarts, Los Altos, CA (US); Michael J. Cumbo, Santa Rosa, CA (US)--.

Signed and Sealed this

Twenty-fifth Day of November, 2008

JON W. DUDAS
*Director of the United States Patent and Trademark Office*